United States Patent
Lee et al.

(10) Patent No.: US 9,837,687 B2
(45) Date of Patent: Dec. 5, 2017

(54) BATTERY MODULE

(71) Applicant: SAMSUNG SDI CO., LTD., Yongin-si, Gyeonggi-do (KR)

(72) Inventors: Jang-Wook Lee, Yongin-si (KR); Young-Il Kim, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 240 days.

(21) Appl. No.: 14/558,997

(22) Filed: Dec. 3, 2014

(65) Prior Publication Data

US 2015/0171482 A1    Jun. 18, 2015

(30) Foreign Application Priority Data

Dec. 16, 2013  (KR) .................. 10-2013-0156390

(51) Int. Cl.
| | |
|---|---|
| *H01M 10/42* | (2006.01) |
| *H01M 2/34* | (2006.01) |
| *H01M 2/10* | (2006.01) |
| *H01M 2/20* | (2006.01) |

(52) U.S. Cl.
CPC ....... *H01M 10/425* (2013.01); *H01M 2/1077* (2013.01); *H01M 2/206* (2013.01); *H01M 2/34* (2013.01); *H01M 2200/00* (2013.01); *H01M 2200/103* (2013.01)

(58) Field of Classification Search
None
See application file for complete search history.

(56) References Cited

U.S. PATENT DOCUMENTS

| | | | |
|---|---|---|---|
| 2011/0206948 A1 | 8/2011 | Asai et al. | |
| 2012/0225333 A1* | 9/2012 | Kim | H01M 2/021 429/61 |
| 2013/0049649 A1 | 2/2013 | Park et al. | |
| 2013/0183544 A1* | 7/2013 | Yoshioka | H01M 2/1077 429/7 |
| 2013/0183573 A1* | 7/2013 | Yoshioka | H01M 2/1077 429/159 |
| 2013/0337299 A1* | 12/2013 | Sugawara | H01M 2/206 429/61 |
| 2014/0093756 A1* | 4/2014 | Nemoto | H01M 2/043 429/53 |
| 2014/0127555 A1* | 5/2014 | Ishibashi | H01M 2/206 429/160 |

(Continued)

FOREIGN PATENT DOCUMENTS

| | | |
|---|---|---|
| JP | 2008-123927 | 5/2008 |
| JP | 2013-114746 A | 6/2013 |

(Continued)

OTHER PUBLICATIONS

Korean Office Action dated Jun. 21, 2016.

(Continued)

*Primary Examiner* — Scott J Chmielecki
(74) *Attorney, Agent, or Firm* — Lee & Morse P.C.

(57) ABSTRACT

A battery module includes a plurality of battery cells arranged in one direction, a pair of end plates at outsides of respective outermost battery cells among the plurality of battery cells, a pair of end blocks between the end plates and the respective outermost battery cells, and a protection device in at least one end block of the pair of end blocks.

19 Claims, 4 Drawing Sheets

(56) References Cited

U.S. PATENT DOCUMENTS

| | | | | |
|---|---|---|---|---|
| 2015/0357617 A1* | 12/2015 | Okada | ............... | H01M 2/1077 |
| | | | | 429/120 |
| 2016/0099459 A1* | 4/2016 | Doornekamp | ........ | H01M 2/204 |
| | | | | 429/61 |
| 2016/0149177 A1* | 5/2016 | Sugeno | ............... | H01G 11/10 |
| | | | | 307/9.1 |

FOREIGN PATENT DOCUMENTS

| | | |
|---|---|---|
| JP | 2013-246941 A | 12/2013 |
| KR | 10-2011-0097666 | 8/2011 |
| KR | 10-2013-0022273 | 3/2013 |
| KR | 10-2013-0110943 | 10/2013 |

OTHER PUBLICATIONS

Registration Determination Certificate issued by the Korean Industrial Property Office on Dec. 27, 2016 in the examination of Korean Patent Application No. 10-2013-156390.

* cited by examiner

BATTERY MODULE

CROSS-REFERENCE TO RELATED APPLICATION

Korean Patent Application No. 10-2013-0156390 filed on Dec. 16, 2013, in the Korean Intellectual Property Office, and entitled: "BATTERY MODULE," is incorporated by reference herein in its entirety.

BACKGROUND

Embodiments relate to a battery module.

SUMMARY

Embodiments are directed to a battery module including a plurality of battery cells arranged in one direction, a pair of end plates at outsides of respective outermost battery cells among the plurality of battery cells, a pair of end blocks between the end plates and the respective outermost battery cells, and a protection device in at least one end block of the pair of end blocks.

The at least one end block may include a main body portion in which the protection device is positioned, and a cover portion between the main body portion and a respective end plate of the pair of end plates to cover the protection device.

The main body portion of the end block may include a first mounting portion having the protection device positioned thereon.

The cover portion may include an insulating material.

The main body portion may include an insulating material.

A first connection member and a second connection member are positioned in the main body portion, An end of the first connection member may be connected to one side of the protection device. An end of the second connection member may be connected to another side of the protection device.

The main body portion may include a second mounting portion having the first connection member positioned thereon and a third mounting portion having the second connection member positioned thereon.

The cover portion may cover at least portions of the first connection member and the second connection member.

The protection device may be connected to at least one of the first connection member and the second connection member through screw coupling.

The battery module may further include bus-bars that connect the plurality of battery cells. Among the bus-bars, a bus-bar connected one of the outermost battery cells may include a first electrode terminal, and a bus bar connected to another one of the outermost battery cells may include a second electrode terminal.

The first electrode terminal and second electrode terminal may be positioned in a diagonal direction to each other. Another end of the first connection member positioned in the main body portion is electrically connected to the first electrode terminal.

Another end of the second connection member and the second electrode terminal may be positioned at a same side of the battery module with respect to a width direction of the battery cells.

The number of the plurality of battery cells may be an odd number.

The protection device may be a fuse, a shunt, or a relay.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
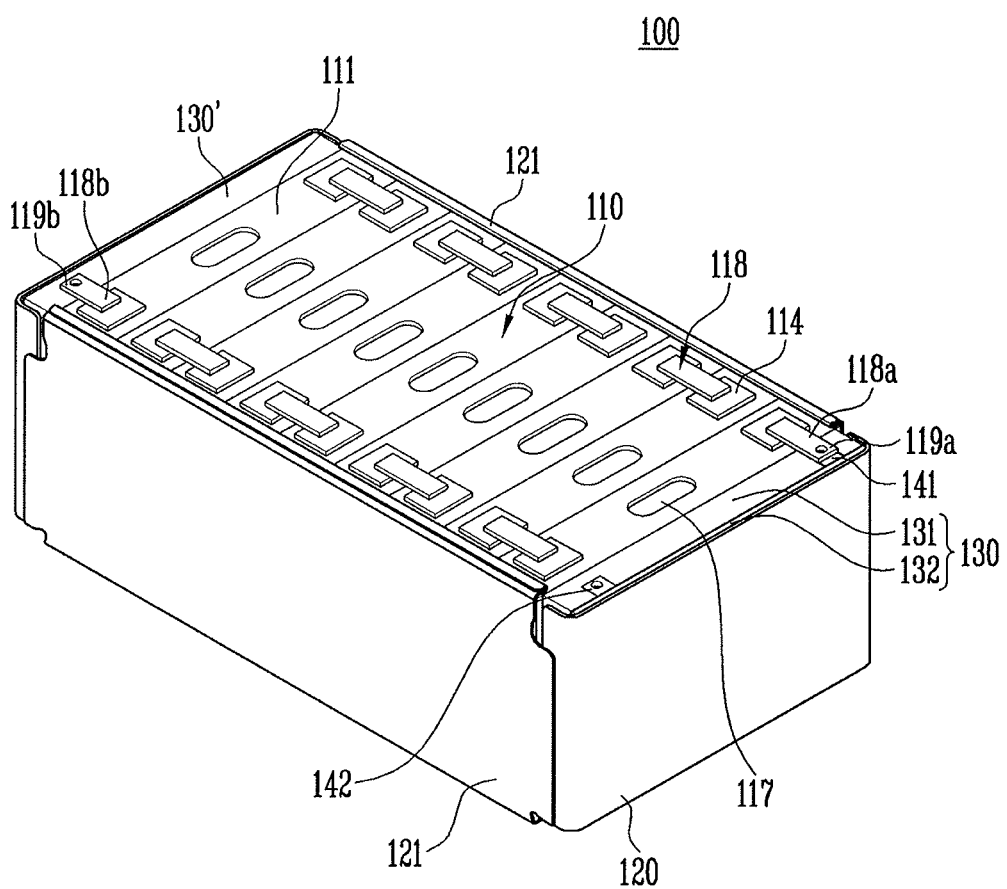
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 is a perspective view of a battery module 100 according to an embodiment. Hereinafter, the battery module 100 according to this embodiment will be described with reference to FIG. 1.

As shown in FIG. 1, the battery module 100 according to this embodiment includes a plurality of battery cells 110 aligned in one direction, a pair of end plates 120 respectively disposed at outsides of outermost battery cells 111 among the plurality of battery cells 110, and a pair of end blocks 130 and 130' respectively positioned between the end plates 120 and the outermost battery cells 111. A protection device 140 (see FIG. 3) may be positioned in at least one of the end blocks 130 and 130'.

The battery cell 110 is a device that generates energy. Each battery cell 110 may include a battery case, one surface of which is opened, and an electrode assembly and an electrolyte, which are accommodated in the battery case. Inside the case, the electrode assembly and the electrolyte may generate energy through an electrochemical reaction therebetween. The battery case may be hermetically sealed by one surface of the battery cell 110 including, for example, a cap assembly. In addition, a terminal portion 114, i.e., positive and negative electrode terminals having different polarities may be formed to protrude from the one surface of the battery cell 110. A vent portion 117 acting as a passage through which gas generated in the battery cell 110 is exhausted to the outside of the battery cell 110 may be further formed as a safety device of the battery cell 110 in the one surface of the battery cell 110.

The terminal portions 114 of adjacent battery cells 110 among the plurality of battery cells 110 may be electrically connected in series or parallel through a bus-bar 118. The bus-bar 118 may be fixed to the terminal portion 114, using a process, e.g., welding or the like. Among the bus-bars 118, the other ends of first and second bus-bars 118a and 118b having one ends electrically connected to only the outermost battery cells 111 may protrud toward the end plates 120 to become first and second electrode terminals 119*a* and 119*b*, respectively. The first and second electrode terminals 119*a* and 119*b* may have different polarities from each other.

The end plates 120 are members respectively disposed at the outsides of the outermost battery cells 111 among the plurality of battery cells 110. The end plates 120, together with the end blocks 130 and 130', enable the plurality of battery cells 110 to be disposed in the arrangement direction of the battery cells 110.

The end plate 120 may be made of, for example, a metal, so as to sufficiently ensure the rigidity of the battery module 100. The end plate 120 may be configured as a pair of end plates respectively positioned at outsides of wide surfaces of both of the outermost battery cells 111. The pair of end plates 120, together with side plates 121 connecting between the end plates 120, may constitute a housing, thereby protecting the battery cells 110.

The end block 130 or 130' may be positioned between the end plate 120 and the outermost battery cell 111. The end plate 120 may have a bent portion to protect the end block 130 or 130'. The end plate 120 may be coupled to the side plate 121 through the bend portion, using a process, e.g., welding or the like.

The end blocks 130 and 130' are members respectively positioned between the end plates 120 and the outermost battery cells 111. The end blocks 130 and 130', together with the end plates 120, may enable the plurality of battery cells 110 to be disposed in the arrangement direction of the battery cells 110.

The end blocks 130 and 130' may be made of a material having properties different from the properties of the end plate 120. The end block 130 or 130' may come into contact with the outermost battery cell 111. The end block 130 or 130' may be made of an insulating material to prevent a risk such as a short circuit. The end block may be configured as a pair of end blocks to respectively correspond to the pair of end plates 120.

Figure 2:
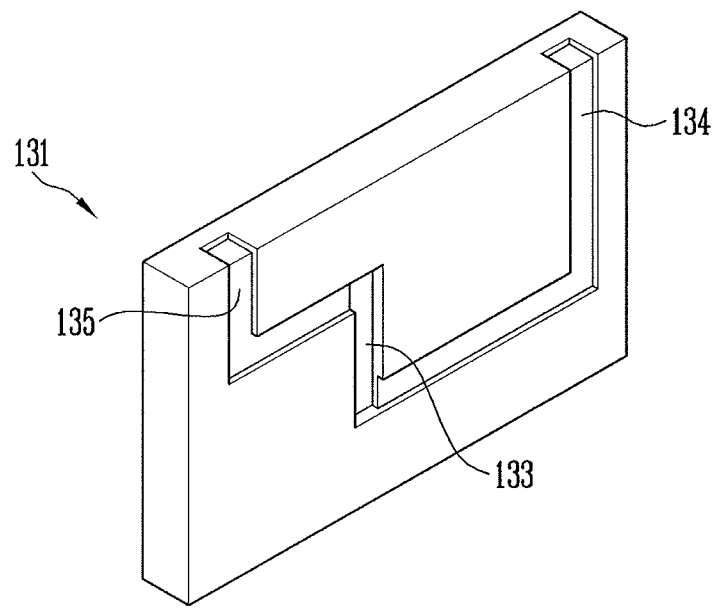
FIGS. 2 to 4 are perspective views illustrating stages of a process of manufacturing an end block of the battery module shown in FIG. 1.
Figure 3:
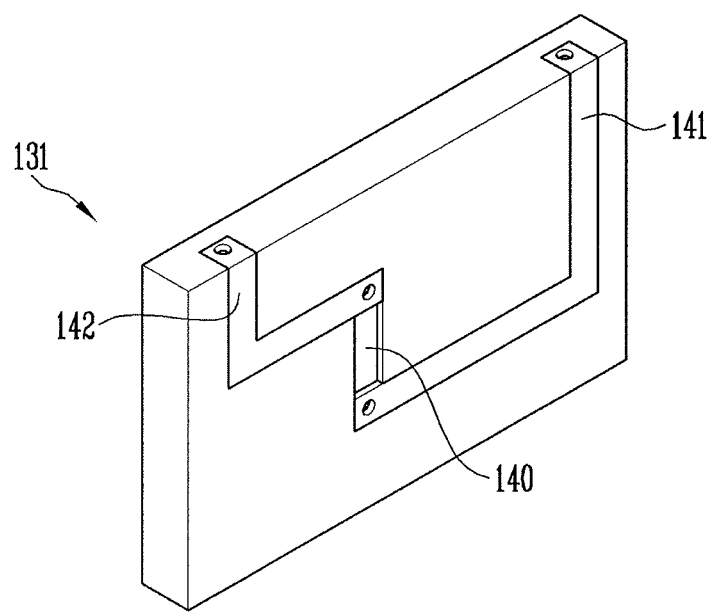
Figure 4:
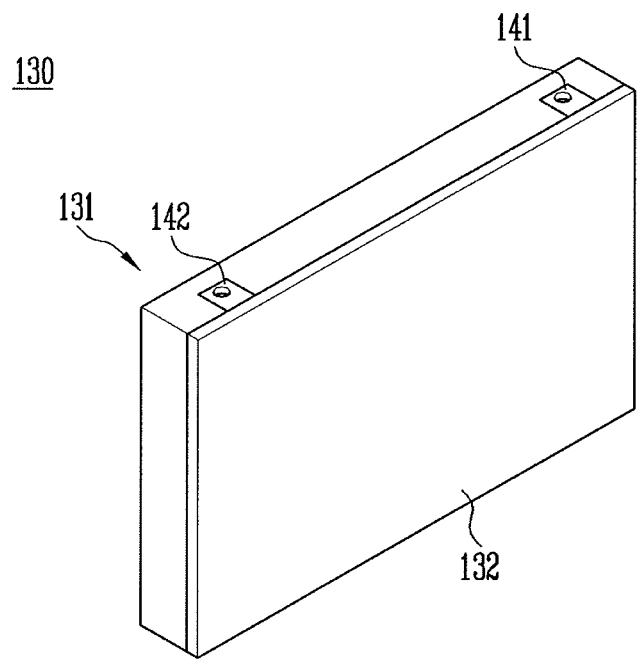

FIGS. 2 to 4 are perspective views illustrating stages of a process of manufacturing an end block 130 of the battery module 100 shown in FIG. 1. Hereinafter, the end block 130 according to this embodiment will be described in detail with reference to FIGS. 2 to 4. The end block 130 shown in FIGS. 2 to 4 may be at least one of the pair of end blocks 130 and 130' shown in FIG. 1.

As shown in FIGS. 2 to 4, the end block 130 according to this embodiment may include a main body portion 131 and a cover portion 132. A protection device 140 may be positioned in the end block 130.

The main body portion 131, as shown in FIGS. 1 and 2, may be disposed adjacent to the outermost battery cell 111. The cover portion 132 may be disposed between the main body portion 131 and the end plate 120.

First, second, and third mounting portions 133, 134 and 135 may be formed in the main body portion 131 (see FIG. 2). The protection device 140 may be positioned on the first mounting portion 133, a first connection member 141 may be positioned on the second mounting portion 134, and a second connection member 142 may be positioned on the third mounting portion 135 (see FIG. 3). Each mounting portion 133, 134, or 135 may be, for example, a space formed by a groove or rib, a hook or the like. The mounting portions 133, 134, and 135 may be formed in a shape capable of aligning or fixing the protection device 140, the first connection member 141, and the second connection member 142 respectively positioned thereon.

The main body portion 131 may be a portion of the end block 130 most adjacent to the outermost battery cell 111. The main body portion 131 may accommodate the first and second connection members 141 and 142, which are conductors. The main body portion 131 may include an insulating material such that an undesired short circuit does not occur.

The protection device 140, may be mounted on the first mounting portion 133 of the main body portion 131, as shown in FIG. 3.

The protection device 140 may be a member that blocks an abnormal current from flowing in the battery module 100. the protection device may be, for example, a fuse, shunt, relay or the like. If an abnormal current flows in the battery module 100, the resistance of the protection device 140 may be increased to block the current. The protection device 140 may protect the battery module 100 from an overcurrent. The protection device 140 may be positioned in the end block 130, such that it may be possible to efficiently use a space in the battery module and to improve the safety of the battery module 100 as the protection device 140 blocks the abnormal current.

Respective sides of the protection device 140 may be connected to the first and second connection members 141 and 142. The first and second connection members 141 and 142 may be positioned on the second and third mounting portions 134 and 135 of the main body portion 131, respectively. For example, one end of each of the first and second connection members 141 and 142 may be firmly connected to the protection device 140 through screw coupling. Meanwhile, the other end of each of the first and second connection members 141 and 142 may have a shape that bends to an outside of the main body portion 131. For example, the other end of each of the first and second connection members 141 and 142 may have a shape crossing over a top surface of the main body portion 131, to be exposed to the outside of the main body portion 131. The first electrode terminal 119*a* of the first bus-bar 118*a*, described above, may protrude toward the end block 130 to be electrically connected to the exposed other end of the first connection member 141 (see FIG. 1) Current transferred to the first connection member 141 may be transferred to the second connection member 142 through the protection device 140. As a result, the exposed other end of the second connection member 142, together with the second electrode terminal 119*b* of the second bus-bar 118*b*, may serve as a final terminal. An external device may be connected to the other end of the second connection member 142 and the second electrode terminal 119*b* so that the power of the battery module 100 may be transferred to the external device.

The cover portion 132, as shown in FIG. 4, is a member disposed between the main body portion 131 and the end plate 120 to cover the protection device 140 disposed in the main body portion 131.

The cover portion 132 may cover the protection device 140 in the main body portion 131 such that the protection device 140 may not be exposed to the outside. The cover portion 132 may be made of an insulating material such that an undesired short circuit between the cover portion 132 and the protection device 140 may not occur. The cover portion 132 may also cover the first and second connection members 141 and 142, except for the exposed other ends of the first and second connection members 141 and 142. Even when the cover portion 132 is coupled to the main body portion 131, the other end of the first connection member 141 may be exposed to the outside to be electrically connected to the first electrode terminal 119*a*. The other end of the second connection member 142 may be exposed to the outside to be connected as a final terminal of the battery module 100 to an external device.

The cover portion 132 may be coupled to the main body portion 131 through mechanical coupling or screw coupling. The cover portion 132 may not necessarily be applied to all surfaces of the main body portion 131 as shown in FIG. 4. For example, the cover portion 132 may be applied to cover only some surfaces of the main body portion 131.

Figure 5:
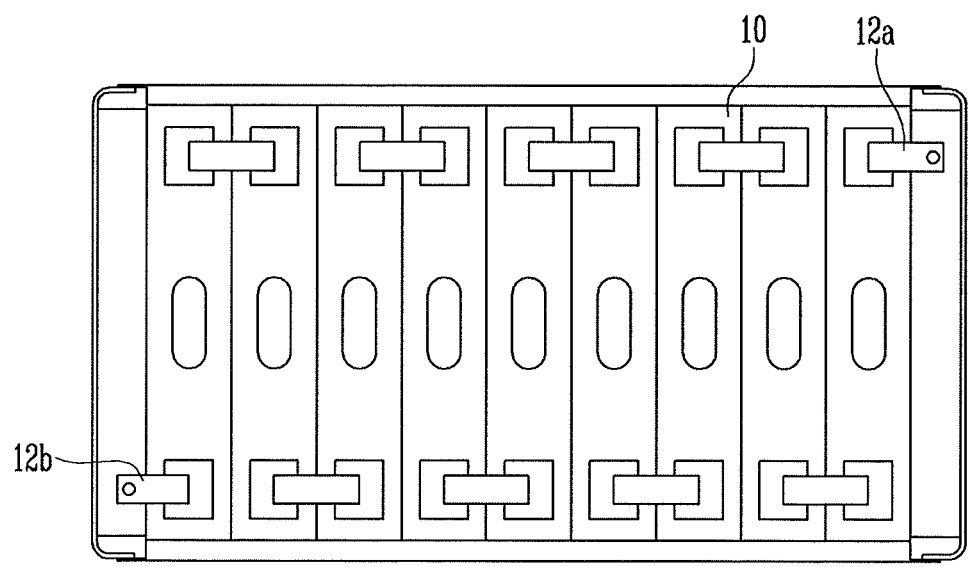
FIG. 5 illustrates a plan view of a battery module according to a comparative embodiment.
Figure 6:
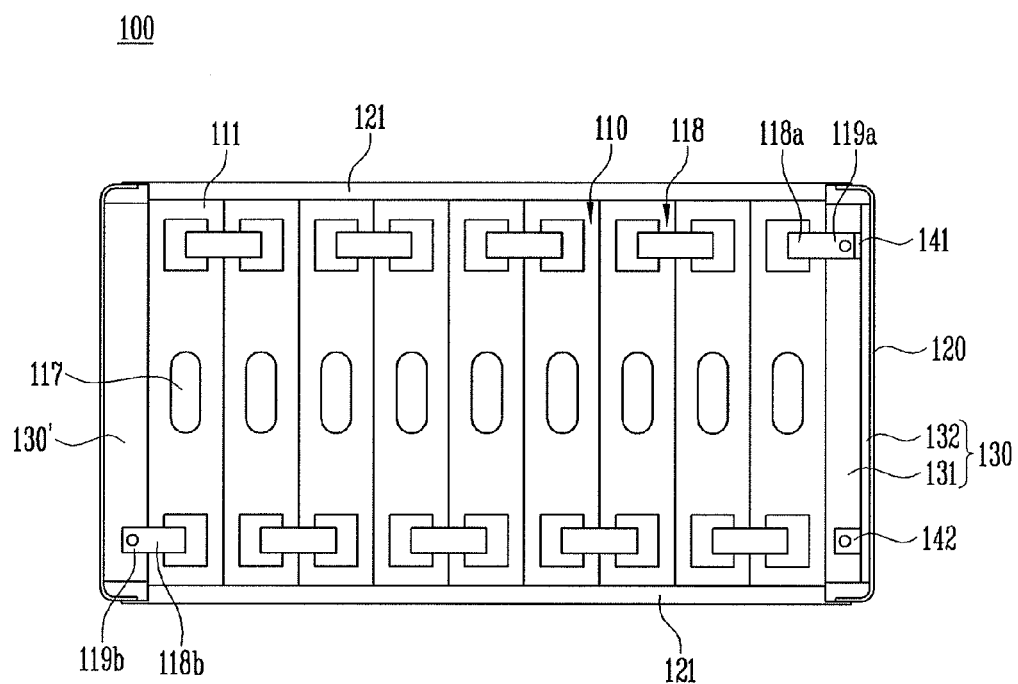
FIG. 6 illustrates a plan view of the battery module shown in FIG. 1.

FIG. 5 is a plan view of a battery module according to a comparative embodiment. FIG. 6 is a plan view of the battery module 100 shown in FIG. 1. Hereinafter, the disposition of the battery module 100 according to these embodiments will be described in detail with reference to FIGS. 5 and 6.

When the number of a plurality of battery cells included in a battery module is an even number, final terminals of the battery module may be positioned in the same direction, for example at a same side of the battery module with respect to a width direction of the battery cells, perpendicular to an arrangement direction of the battery cells. However, when the number of battery cells 10 is an odd number (nine in FIG. 5), final terminals 12a and 12b of the battery module may not be located in the same direction or on the same side, but may be positioned in a diagonal direction to each other. In this case, a longer wire may be needed to connect the battery module to an external device or a battery discharging unit (BDU). Therefore, it may be difficult to use the battery module.

However, when the end block 130 according the embodiment illustrated in FIGS. 1 to 4 and 6 is used, it may be possible to provide final terminals on a same lateral side of the battery module (with respect to a width direction of the battery cells) even when the number of the battery cells 110 is an odd number. Specifically, when the number of the battery cells 110 is an odd number, the first and second electrode terminals 119a and 119b may be positioned in a diagonal direction to each other as shown in FIG. 6. In this case, the first electrode terminal 119a is connected to the other end of the first connection member 141 positioned in the main body portion 131, the one end of the first connection member 141 is connected to the protection device 140, and the protection device 140 is connected to the second connection member 142, such that the exposed other end of the second connection member 142 may finally function as a final terminal. In this case, the other end of the second connection member 142 is positioned in the same direction or side (a lower direction or side in FIG. 6) as the second electrode terminal 119b which performs the function of another final terminal having a polarity opposite to that of the other end of the second connection member 142. Accordingly, the length of a wire used to connect the battery module 100 an external device or a BDU may be shorter, such that it may be possible to provide convenience in terms of design and spatial efficiency.

Thus, according to embodiments, the protection device 140 may be positioned in the end block 130, so that it may be possible to provide not only spatial efficiency according to the disposition of the protection device 140 but also spatial efficiency in the external connection relationship of the battery module.

Meanwhile, although it has been described in this embodiment that the end block 130 having the protection device 140 positioned therein may be any one of the pair of end blocks 130 and 130', in other implementations, the pair of end blocks 130 and 130' may have the same structure so that the protection device 140 may be positioned in each of the end blocks 130 and 130'. Although it has been described in this embodiment that the battery cells are connected in series, in other implementations the battery cells may be connected in parallel.

By way of summation and review, a high-power battery module using a non-aqueous electrolyte with high energy density has recently been developed. The high-power battery module may be configured as a high-voltage or large-capacity battery module manufactured by connecting a plurality of battery cells in parallel or series so as to be used in driving motors of devices requiring high power, e.g., electric vehicles and the like. Further, a battery pack can be configured by electrically connecting such a plurality of battery modules to one another.

As the number of devices employing the battery module increases, it has become desirable to improve the productivity of the battery module. As the external appearance of the devices has been diversified, it has become desirable to vary the shape of the battery module while securing the safety of the battery module.

Embodiments provide a battery module which can improve the safety of the battery module while efficiently using a space in the battery module. According to embodiments, the protection device is positioned in the end block of the battery module, so that it may be possible to improve the safety of the battery module while efficiently using the space in the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
    a plurality of battery cells arranged in one direction;
    a pair of end plates at outermost sides of respective outermost battery cells among the plurality of battery cells, the outermost sides and outermost battery cells being outermost in the one direction;
    a pair of end blocks between the end plates and the outermost sides of the respective outermost battery cells, each end block of the pair of end blocks being a three-dimensional block of solid material; and
    a protection device within the three-dimensional block of at least one end block of the pair of end blocks;
    wherein the at least one end block of the pair of end blocks includes a groove within the three-dimensional block, the protection device being positioned within the groove.

2. The battery module as claimed in claim 1, wherein the three-dimensional block of the end block includes:
    a three-dimensional main body portion in which the protection device is positioned, and
    a cover portion between the main body portion and a respective end plate of the pair of end plates to cover the protection device.

3. The battery module as claimed in claim 2, wherein the main body portion of the end block includes a first mounting portion having the protection device positioned thereon.

4. The battery module as claimed in claim 2, wherein the cover portion includes an insulating material.

5. The battery module as claimed in claim 2, wherein the main body portion is a three-dimensional insulating material.

6. The battery module as claimed in claim 2, wherein:
a first connection member and a second connection member are positioned in the main body portion,
an end of the first connection member is connected to one side of the protection device, and an end of the second connection member is connected to another side of the protection device.

7. The battery module as claimed in claim 6, wherein the main body portion includes a second mounting portion having the first connection member positioned thereon and a third mounting portion having the second connection member positioned thereon.

8. The battery module as claimed in claim 6, wherein the cover portion covers at least portions of the first connection member and the second connection member.

9. The battery module as claimed in claim 6, wherein the protection device is connected to at least one of the first connection member and the second connection member through screw coupling.

10. The battery module as claimed in claim 6, further comprising bus-bars that connect the plurality of battery cells,
wherein, among the bus-bars, a bus-bar connected one of the outermost battery cells includes a first electrode terminal, and a bus bar connected to another one of the outermost battery cells includes a second electrode terminal.

11. The battery module as claimed in claim 10, wherein:
the first electrode terminal and second electrode terminal are positioned in a diagonal direction to each other, and
another end of the first connection member positioned in the main body portion is electrically connected to the first electrode terminal.

12. The battery module as claimed in claim 11, wherein another end of the second connection member and the second electrode terminal are positioned at a same side of the battery module with respect to a width direction of the battery cells.

13. The battery module as claimed in claim 1, wherein the number of the plurality of battery cells is an odd number.

14. The battery module as claimed in claim 1, wherein the protection device is a fuse, a shunt, or a relay.

15. The battery module as claimed in claim 1, wherein the at least one end block includes a main body portion including a first lateral side contacting the outermost side of one of the outermost battery cells, and a second lateral side on an opposite side of the main body portion from the first lateral side, the protection device being located at the second lateral side.

16. The battery module as claimed in claim 15, further comprising:
a first connection member having a first end connected to one side of the protection device and a second end connected to a terminal of the one of the outermost battery cells, and
a second connection member having a first end connected to another side of the protection device and a second end connectable to an external device.

17. The battery module as claimed in claim 16, wherein:
the second end of the first connection member and the second end of the second connection member are located in grooves in a top side of the main body portion between the first lateral side and the second lateral side, and
the protection device, the first connection member, and the second connection member are located in grooves in the second lateral side.

18. The battery module as claimed in claim 1, further comprising a cover extending along the three-dimensional block to cover the groove, the cover being between the groove and an adjacent end plate of the ends plates.

19. The battery module as claimed in claim 1, wherein each end block of the pair of end blocks is an insulator with a shape of a rectangular prism directly between an adjacent end plate of the ends plates and a corresponding outermost battery cell of the outermost battery cells, the protection device being positioned within the rectangular prism.

* * * * *